US010831520B2

(12) United States Patent
Sharma et al.

(10) Patent No.: US 10,831,520 B2
(45) Date of Patent: Nov. 10, 2020

(54) OBJECT TO OBJECT COMMUNICATION BETWEEN HYPERVISOR AND VIRTUAL MACHINES

(71) Applicant: NICIRA, INC., Palo Alto, CA (US)

(72) Inventors: Nidhi Sharma, Pune (IN); Rayanagouda Bheemanagouda Patil, Pune (IN); Goresh Musalay, Pune (IN)

(73) Assignee: Nicira, Inc., Palo Alto, CA (US)

( * ) Notice: Subject to any disclaimer, the term of this patent is extended or adjusted under 35 U.S.C. 154(b) by 258 days.

(21) Appl. No.: 15/904,449

(22) Filed: Feb. 26, 2018

(65) Prior Publication Data
US 2019/0213026 A1    Jul. 11, 2019

(30) Foreign Application Priority Data

Jan. 11, 2018 (IN) .............................. 201841001293

(51) Int. Cl.
*G06F 9/455* (2018.01)
*G06F 8/65* (2018.01)
*G06F 9/50* (2006.01)

(52) U.S. Cl.
CPC ............ *G06F 9/45558* (2013.01); *G06F 8/65* (2013.01); *G06F 9/45533* (2013.01); *G06F 9/50* (2013.01); *G06F 2009/4557* (2013.01); *G06F 2009/45562* (2013.01); *G06F 2009/45579* (2013.01); *G06F 2009/45587* (2013.01)

(58) Field of Classification Search
None
See application file for complete search history.

(56) References Cited

U.S. PATENT DOCUMENTS

| 9,430,264 | B2 * | 8/2016 | Tang ................... G06F 9/45545 |
| 9,582,309 | B2 * | 2/2017 | Pannem .............. G06F 9/45558 |
| 10,459,802 | B2 * | 10/2019 | Devitt-Carolan .......................... G06F 11/1438 |
| 10,496,819 | B2 * | 12/2019 | Vlaznev ................ G06F 21/567 |
| 2016/0162315 | A1 * | 6/2016 | Pannem .............. G06F 9/45558 718/1 |
| 2017/0337377 | A1 * | 11/2017 | Vlaznev ................ G06F 21/564 |
| 2019/0095241 | A1 * | 3/2019 | Ago ...................... G06F 9/5005 |

OTHER PUBLICATIONS

Naji et al. "A secure virtualization architecture based on a nested Nova hypervisor", 2017 IEEE, 7 pages.*
Wu et al. "Virtual Machine Management Based on Agent Service", 2010 IEEE, pp. 199-204.*

* cited by examiner

*Primary Examiner* — Van H Nguyen
(74) *Attorney, Agent, or Firm* — Patterson + Sheridan, LLP

(57) ABSTRACT

A system and method of communicating between a hypervisor and virtual machines using object agents within the hypervisor and the virtual machines. Further, the hypervisor and virtual machines include similar datastore mappings that allow the hypervisor and virtual machines to communicate with each other. The object agent of a virtual machine communicates information corresponding to a first object to the object agent of the hypervisor, and the object agent of the hypervisor updates a datastore mapping of the hypervisor. The hypervisor then communicates the information corresponding to the first object to an object agent of another virtual machine.

20 Claims, 4 Drawing Sheets

OBJECT TO OBJECT COMMUNICATION BETWEEN HYPERVISOR AND VIRTUAL MACHINES

RELATED APPLICATIONS

Benefit is claimed under 35 U.S.C. 119(a)-(d) to Foreign Application Serial No. 201841001293 filed in India entitled "OBJECT TO OBJECT COMMUNICATION BETWEEN HYPERVISOR AND VIRTUAL MACHINES", on Jan. 11, 2018, by Nicira, Inc., which is herein incorporated in its entirety by reference for all purposes.

BACKGROUND

In computing systems having more than one virtual machine, it is common for virtual machines to have duplicate copies of the same data. In such an implementation, the application or guest operating system (OS) level each copy of the data is treated as unique and processed individually. For example, each virtual machine access and updates their copy of the data independently of each other virtual machine. Further, in many instances, each duplicate copy of the data may be independently updated by each virtual machine, increasing the amount of processing that is required to update the data.

By reducing the number of data storage scans also reduces the amount of processing required to update data to be accessed by the virtual machines. For example, in a system including a hypervisor and one or more virtual machines, communication between agent objects reduces processing requirements within a computing system having hypervisors and virtual machines. In some techniques, object agents are used to communicate between datastore mappings of the hypervisor and virtual machines to reduce the need for each virtual machine to access the file system to update corresponding files (or data). Communication between object agents bypasses the file system for various computing tasks, providing a more efficient access by the virtual machines to stored data.

SUMMARY

A method of communicating between a hypervisor and virtual machines comprises, the method communicating information corresponding to a first object of a first virtual machine from an object agent in the first virtual machine to an object agent in the hypervisor. Further, the method comprises, updating, by the object agent in the hypervisor, a datastore mapping of the hypervisor based on the information corresponding to the first object. The method further includes, communicating the information corresponding to first object from the object agent in the virtual machine to an object agent in a second virtual machine, and updating, by the object agent of the hypervisor, a datastore mapping within the second virtual machine with the information corresponding to the first object.

In one embodiment, a system for datastore management comprises a hypervisor, a first virtual machine and a second virtual machine. The hypervisor comprises a first datastore mapping and a first object agent. The first virtual machine runs on the hypervisor and includes a second datastore mapping, a first plurality of objects and a second object agent. The second object agent is communicatively coupled with the first object agent. The second virtual machine runs on the hypervisor and includes a third datastore mapping, a second plurality of objects and a third object agent. The second object agent is configured to communicate information corresponding to a first object of the first plurality of objects to the first object of the plurality of objects to the first object agent. The third agent is communicatively coupled with the first object agent and receives from the information corresponding to the first object and updates a corresponding object of the second plurality of objects.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
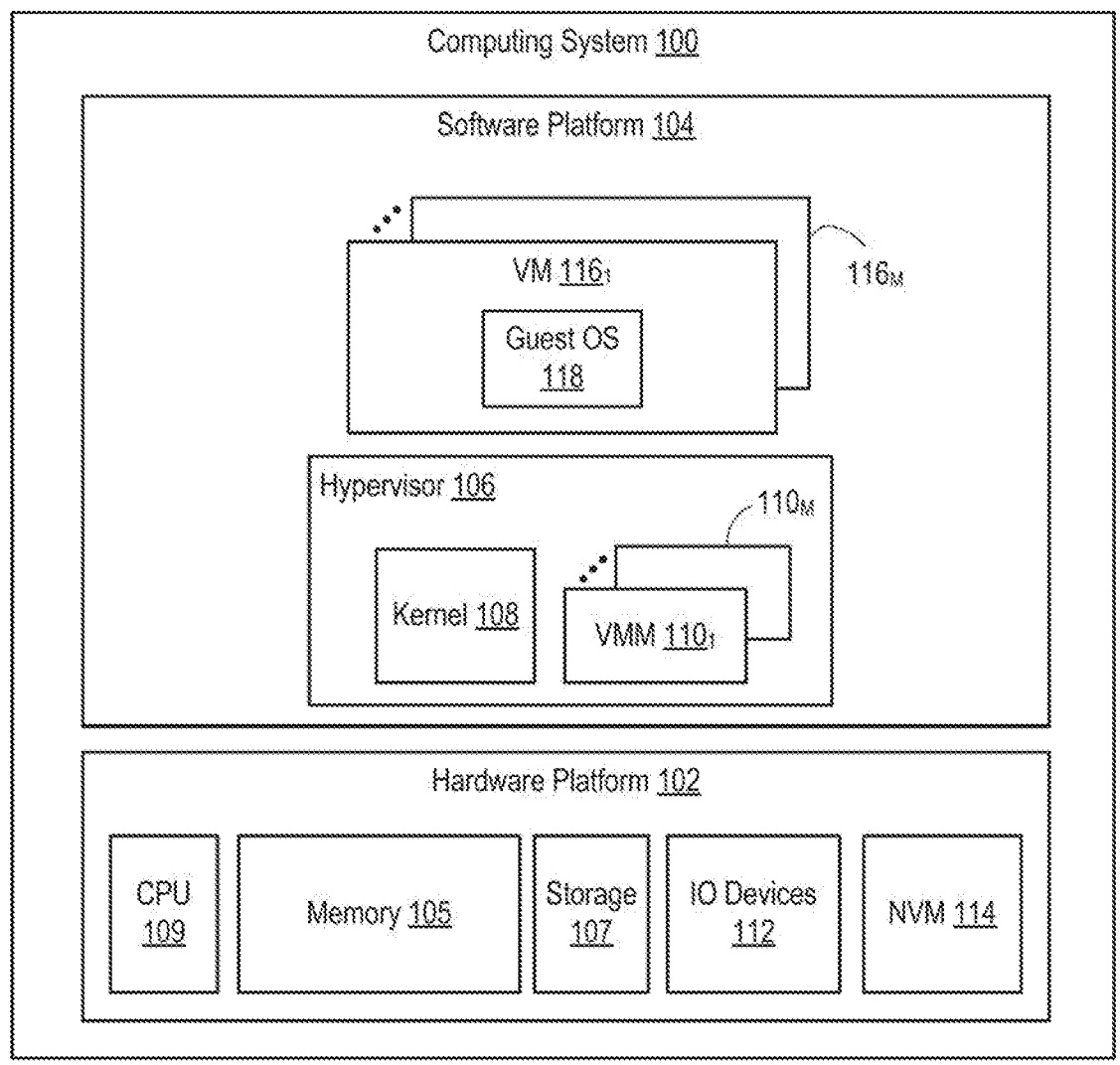
FIG. 1 is a block diagram depicting a computing system according to another embodiment.

FIG. 1 is a block diagram depicting a computing system 100 according to an embodiment. Computing system 100 includes a software platform 104 executing on a hardware platform 102. Hardware platform 102 may include conventional components of a computing device, such as a central processing unit (CPU) 109, system memory ("memory" 108), storage 107, input/output (IO) devices 112, a nonvolatile memory (NVM) 114. CPU 109 is configured to execute instructions, for example, executable instructions that perform one or more operations described herein and may be stored in memory 105 and storage 107. Memory 105 is a device allowing information, such as executable instructions, virtual disks, configurations, and other data, to be stored and retrieved. Memory 105 may include, for example, one or more random access memory (RAM) modules. Storage 107 includes local storage devices (e.g., one or more hard disks, flash memory modules, solid state disks, and optical disks) and/or a storage interface that enables computing system 100 to communicate with one or more network data storage systems. Examples of a storage interface are a host bus adapter (HBA) that couples computing system 100 to one or more storage arrays, such as a storage area network (SAN) or a network-attached storage (NAS), as well as other network data storage systems. IO devices 112 include conventional interfaces known in the art, such as one or more network interfaces, serial interfaces, universal serial bus (USB) interfaces, and the like. NVM 114 is a device allowing information to be stored persistently regardless of the state of power applied to computing system 100 (e.g., FLASH memory or the like). NVM 114 may store firmware for computing system 100, such as a Basic Input/Output System (BIOS), Unified Extensible Firmware Interface (UEFI), or the like.

Software platform 104 includes a virtualization layer that abstracts processor, memory, storage, and networking resources of hardware platform 102 into one or more virtual machines ("VMs") $116_1$ . . . $116_M$ (collectively VMs 116) that run concurrently on computing system 100. VMs 116 run on top of the virtualization layer, referred to herein as a hypervisor 106, which enables sharing of the hardware resources by VMs 116. One example of hypervisor 106 that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein). Hypervisor 106 is known as a Type-1 or "bare-metal" virtualization software.

Each VM 116 supported by hypervisor 106 includes guest software that runs on the virtualized resources supported by hardware platform 102. In the example shown, the guest software of each VM 116 includes a guest OS 118. Guest OS 118 can be any commodity operating system known in the art, such as such as Linux®, Microsoft Windows®, Mac OS®, or the like.

Hypervisor 106 includes, among other components, a kernel 108 and virtual machine monitors (VMMs) $110_1 \ldots 110_M$ (collectively VMMs 110). Kernel 108 provides operating system functionality (e.g., process creation and control, file system, process threads, etc.), as well as CPU scheduling and memory scheduling. VMMs 110 are processes scheduled by kernel 108 to implement the virtual system support for VMs 116. Each VMM 110 manages a corresponding virtual hardware platform. The virtual hardware platform includes virtual CPUs (vCPUs), guest physical memory, virtual IO devices, and the like.

In an embodiment, guest software in a VM 116 accesses memory using a two-stage address translation scheme. In this context, a virtual address is referred to as a "guest virtual address" or GVA. An intermediate physical address is referred to as a "guest physical address" or GPA. A physical address is referred to as a "host physical address" or HPA.

Figure 2:
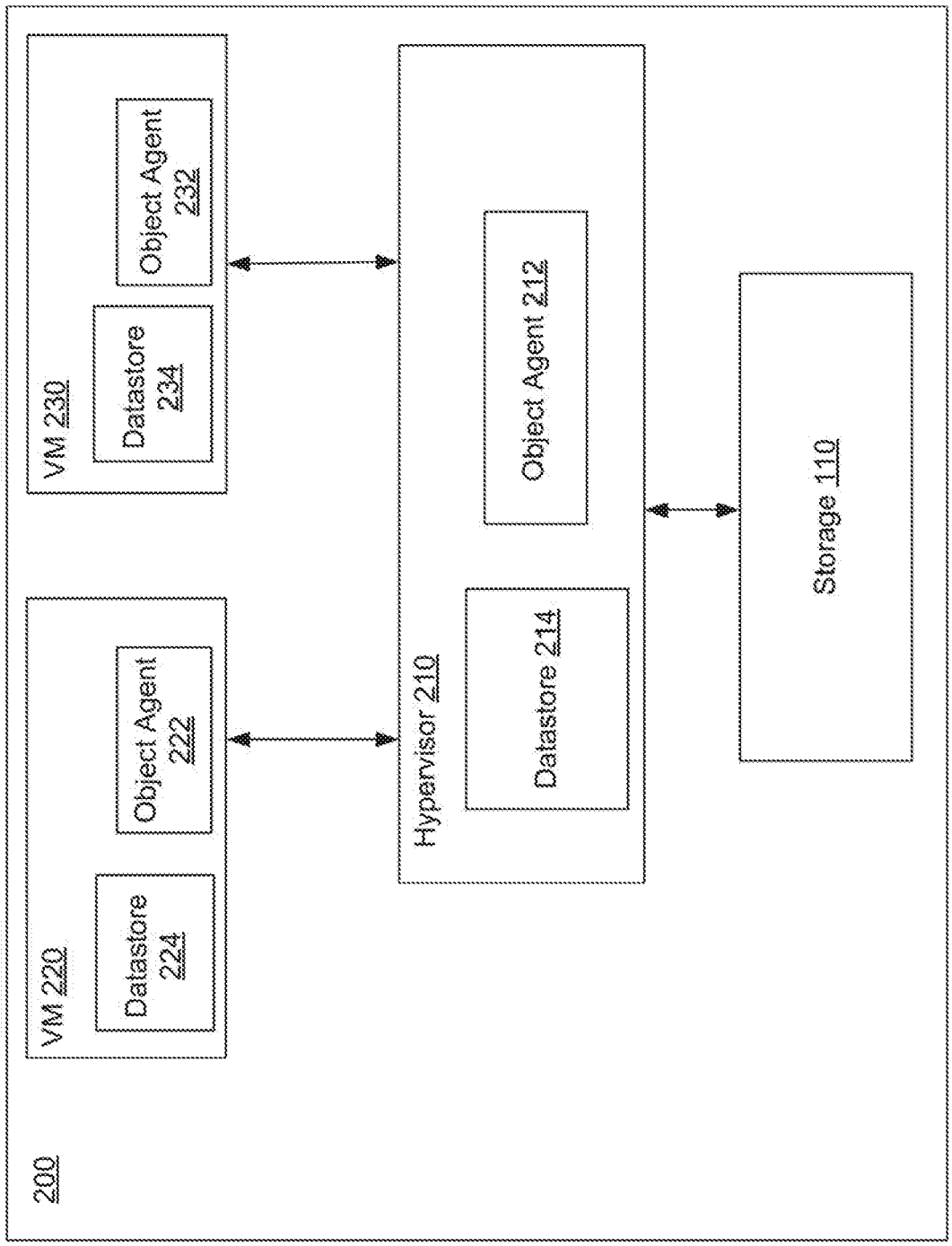
FIG. 2 is a block diagram depicting a computing system according to yet another embodiment.

FIG. 2 is a block diagram of a software platform executing on a computing system 200 according to an embodiment. As illustrated, hypervisor 210 is configured to communicate with virtual machines (VMs) 220 and 230 via object agent 212 of hypervisor 210 and the object agents 222 and 232 of VMs 220 and 230, respectively. Communication via the object agents provides efficient sharing of information between the hypervisor and virtual machines. In one embodiment, computing system 200 employs an object storage architecture of datastores within the hypervisor and VM. For example, an object storage architecture may be applied to datastores 214, 224 and 234.

An object storage architecture is a data storage architecture configured to manage data as objects. Each object of an object storage architecture includes data, metadata, and an identifier. The metadata may include fixed metadata and expandable metadata. Fixed metadata includes filename, create date, type, etc. of the object. Expandable metadata may be customizable and used to capture information corresponding to the object, support data-management policies, centralize management of storage across many individual nodes and clusters of the object storage architecture, and/or optimize metadata storage independently from the data storage. The identifier is a global identifier and unique to each object and allows for each corresponding object to be located over a distributed system.

In one embodiment, object agent 212 runs on hypervisor 210 and hypervisor 210 has datastore 214. Object agent 212 may be configured to create in-memory mappings of datastore 214 (e.g., datastore mappings). For example, datastore 214 may be a host file system, and object agent 212 is configured to convert datastore 214 into an object storage datastore. In one embodiment, hypervisor 210 is communicatively coupled with storage 107.

Object agent 222 runs on VM 220 which includes datastore 224. In one embodiment, datastore 224 is a guest file system. Object agent 222 is configured to creates in-memory mappings of datastore 224 (datastore mappings), converting datastore 224 into an object storage datastore. Further, as described in more detail below, object agent 222 may be configured to contribute to the mapping created by object agent 210.

Object agent 232 runs on VM 230 which includes datastore 234. In one embodiment, datastore 234 is a guest file system. Object agent 232 creates in-memory mappings of datastore 234, converting datastore 234 into an object storage datastore. Further, object agent 232 contributes to the mapping created by object agent 210.

Object agents 222 and 232 may be configured to communicate object information to object agent 212. The object information may be used by object agent 212 in the creation of the in-memory mappings of datastore 214. For example, object agents 222 and 232 may be configured to communicate identifiers and/or metadata of objects created in the datastore mappings for each corresponding VM. In one embodiment, the identifiers for common object differ across VMs. The identifiers and/or metadata maybe incorporated within the in-memory mapping of datastore 214. For example, object agent 212 may generate a global mapping based on the different identifiers used for common objects.

Increased efficiency and/or simplification of communication between object agents 222 and 234 and object agent 212 may be achieved through the conversion of the corresponding datastores to object storage datastores. For example, the object agents are able efficiently track changes within the filesystems and communicate those changes with each other. Further, for files that are common across multiple virtual machines, duplication of data scan requests may be reduced.

In one or more embodiments, the mappings of datastores 224 and 234 (i.e., datastore mappings) of VMs 220 and 230, respectively, include an object identifier for each mapped object, the size of each mapped object, mapping identifier of the object on a corresponding hypervisor, one or more flags for each object, and one or more reserved fields. The object identifier is unique to each object and may also be unique to each VM. The object agents within the VMs generate object identifiers for each object. In one embodiment, object identifiers are not be common across each of the VMs and hypervisor. For example, the object identifier for an object common to multiple VMs differs from VM to VM. Each VM may be configured to communicate their object identifiers to object agent 212 which creates a global mapping of the object identifiers. The global mapping maps common objects, even if they have different identifiers to each other and is used by object agent 212 to communicate with object agents 222 and 234.

The flags for each object may include an indication of a change to (update of) or a current state of a corresponding object. The flag includes information corresponding to each object. For example, a flag may be one of a verdict of a virus scan, an indication of an available software update, and/or any other change to the object. In various embodiments, flags can be used to check access time, scan verdict, last update/last modifier, etc.

In one embodiment, a mapping of datastore 214 of hypervisor 210 includes an object identifier for each mapped object, the size of each mapped object, a reference count for each mapped object indicating how many VMs are associated with each object, and one or more flags for each object.

In various embodiments, the mapping of datastore 214 may also include information regarding the VMs referring to the mapped object. In various embodiments, the identifier is unique to each object and may be one of a unique hash or other identifier. Further, the flags for each object may include information corresponding to each objects. In one embodiment, the flag includes an indication of a change to the object or a current status of the object. In some embodiments, the flags for each object may include an indication of a change to or a current state of the object. For example, a flag may be one of a verdict of a virus scan, an indication of an available software update, and any other change to the object.

The mappings of each datastore 214, 224, and 234 allow the object agents within the hypervisors and VMs to communicate with each other without accessing the file system. In one embodiment, the datastore mapping within the each VMs differ from each other and the hypervisor maintains a global mapping to facilitate communication between object agents. The global mapping may link objects that are common to multiple to various VMs, but have a different identifier within one or more VM. In one embodiment, object agents 212, 222, and 232 communicate with each other using their corresponding mappings of their datastore. For example, object agent 222 of VM 220 may communicate an object identifier along with a flag to object agent 212 of hypervisor 210, when a change to the object occurs. Object identifier 212 determines that VM 230 is associated with the object based on a mapping of datastore 214, and communicates the object identifier of the corresponding object in VM 230 along with the flag to object agent 232.

In one embodiment, VM 220 includes a plurality of objects and updates a flag within the mapping of datastore 224 according to a change to one or more of the objects. Object agent 222 communicates the change to object agent 212. For example, object agent 222 may determine that a virus scan has been completed for an object and update the mapping with the corresponding verdict. The object agent 222 may communicate the object identifier and the corresponding change to object agent 212.

In another example, the mapping for an object may be updated with a software update status, or another change to the software. The corresponding flag reflecting the change, along with the object identifier may be communicated to the object agent on the hypervisor.

In one embodiment, VM 220 completes a virus scan on one or more objects (files) associated with the VM and updates a corresponding flag within a mapping of datastore 224 based on the verdict of the virus scan. The flag within a mapping of datastore 224 may be updated by object agent 220 or another device within VM 220. The flag indicating the verdict and the object identifier may then be communicated by the object agent 222 to object agent 212. The corresponding flag within a mapping of datastore 214 may then be updated by object agent 212 or another element within hypervisor 110 with the updated information. Object agent 212 may identify one or more VMs associated within the object and communicate the updated flag and corresponding object identifier to each associated VM.

For example, when a virus scan is completed on a first file of first virtual machine 220 and the file is determined to be clean, a corresponding flag within a mapping of datastore 224 is updated to reflect that the file is clean. Object agent 222 communicates the object identifier and the flag corresponding to the file to object agent 212. Object agent 212 updates the flag corresponding to the file in a mapping of datastore 214 to reflect that the file was determined to be clean. Further, object agent 212 identifies one or more other VMs comprising the file and communicates the object identifier along with the updated flag to the object agent of each identified VM. The datastore mapping of the identified VMs may then be updated with the updated flag for the corresponding file.

In one embodiment, when a file is determined to be infected by a virus scan completed by VM 220, the corresponding flag within the mapping of datastore 224 is updated. Object agent 222 communicates to object agent 212 that the file is infected by communicating the object identifier along with the updated flag. Object agent 212 updates the corresponding flag within the mapping of datastore 214 that the file is infected and identifies one or additional object agents that comprise the same file. In one embodiment, object agent 212 communicates the object identifier and the updated flag to each the object agent of each identified VM. The object agent of each identified VM updates the flag within the local datastore. When the file is next accessed by the virtual machine, the VM may take appropriate measures to deal with the infected file. For example, the VM may delete or quarantine the file such that access to file is restricted.

In another embodiment, object agent 212 may communicate instructions to delete or quarantine the infected file to the object agent of each identified VM. The VM(s) deletes or quarantines the file in response to the instructions received from object agent 212. Further, the object agent 212 may remove all references of the objects within any cache.

In one or more embodiments, VM 220 performs a software update. Object agent 222 updates a corresponding flag within datastore 224 such that the flag is updated to reflect the software update. Object agent 222 then communicates the updated flag and corresponding object identifier to object agent 212 and object agent 212 updates datastore 214 based on the updated flag. The updated flag may include a notification that a software update was completed, and/or corresponding updated software information. The updated software information may include one or more of a software version, date and/or time when the update occurred, and/or metadata corresponding to the changes made within the updated software version.

In one embodiment, object agent 212 identifies one or more other VMs comprising the object that was updated, and communicates to the object agents of the identified VMs, the object identifier and the updated flag. Each VM may then update the corresponding software. The software update may be completed when communication is received from object agent 212 or when the software accessed. Further, in one embodiment, the software is updated on a within storage 250 based on the receipt of a flag indicating a software change, and the object agent 212 instructs each of the identified VMs to access the updated software instead of non-updated software.

In one embodiment, object agent 212 may receive a restore request from the object agent of a VM (e.g., object agent 222 of VM 220). Object agent 212 may be configured to identify a node associated with the VM making the request, and copy corresponding information from another VM that shares a node with the VM that sent the restore request. The copied information may be used to restore the VM to a previous or alternate state.

In one embodiment, object agent 212 is configured to learn one or more behaviors of connected VMs for performance improvements. In various embodiments, the object agent 212 is configured to learn the behavior of linked clone virtual machines, improve migration of VMs, and storage of VMs. The object agent 212 may be configured to detect duplication of objects at a high level. For example, the object agent 212 identifies VMs that a have a shared configuration and updates shared blocks together. In one specific example, VM 220 updates "N" blocks, which are shared with virtual machine 130. In such an example, instead of VM 230 being required to update the "N" blocks, object agent 212 updates the reference of datastore 234 within VM 230 to refer to the updated "N" blocks. In one embodiment, in response to a clone request, object agent 212 updates a reference count within the mapping of datastore 214 and communicate the updated information to the corresponding VM object agent.

In one embodiment, when one or more performance issues are identified within linked cloned VMs, the object agent 212 may be configured to delink the linked VMs. For example, the object agent 212 may be configured to delink the VM disks of the linked VMs. In one or more embodiments, in response to a delink request, object agent 212 updates a reference count within the mapping of datastore 214 and communicates the updated information to the corresponding VM object agent.

In various embodiments, the object agent within the hypervisor (object agent 212 of hypervisor 210) is configured recover a VM. For example, the object agent 212 may be configured to locate duplicate data of the VM to be recovered and copy the duplicate data within a datastore of the VM. The duplicate data may be located within a datastore of the hypervisor and/or within a datastore of one or more connected VM. In one embodiment, the object agent within a VM acts as a client and request recovery information from the object agent of a hypervisor. In such an embodiment, the object agent of the hypervisor acts as a server and responds with required data and updates a corresponding reference count.

In one or more embodiments, an object agent within the hypervisor is configured to group objects based on one or more of a frequency of access time, sequence of the file access, and group of legacy files. Further, the object agent may be configured make one or more performance related decisions based on the above grouping(s) of objects. The performance related decisions may correspond to the type of memory type requirements, memory parameters, and/or processor requirements. In one embodiment, the parameters that may be employed for optimization and grouping may be learned by integrating the system within machine learning. Further, in various embodiments, environment and/or configuration of the storage media attached with a hypervisor may be optimized.

Figure 3:
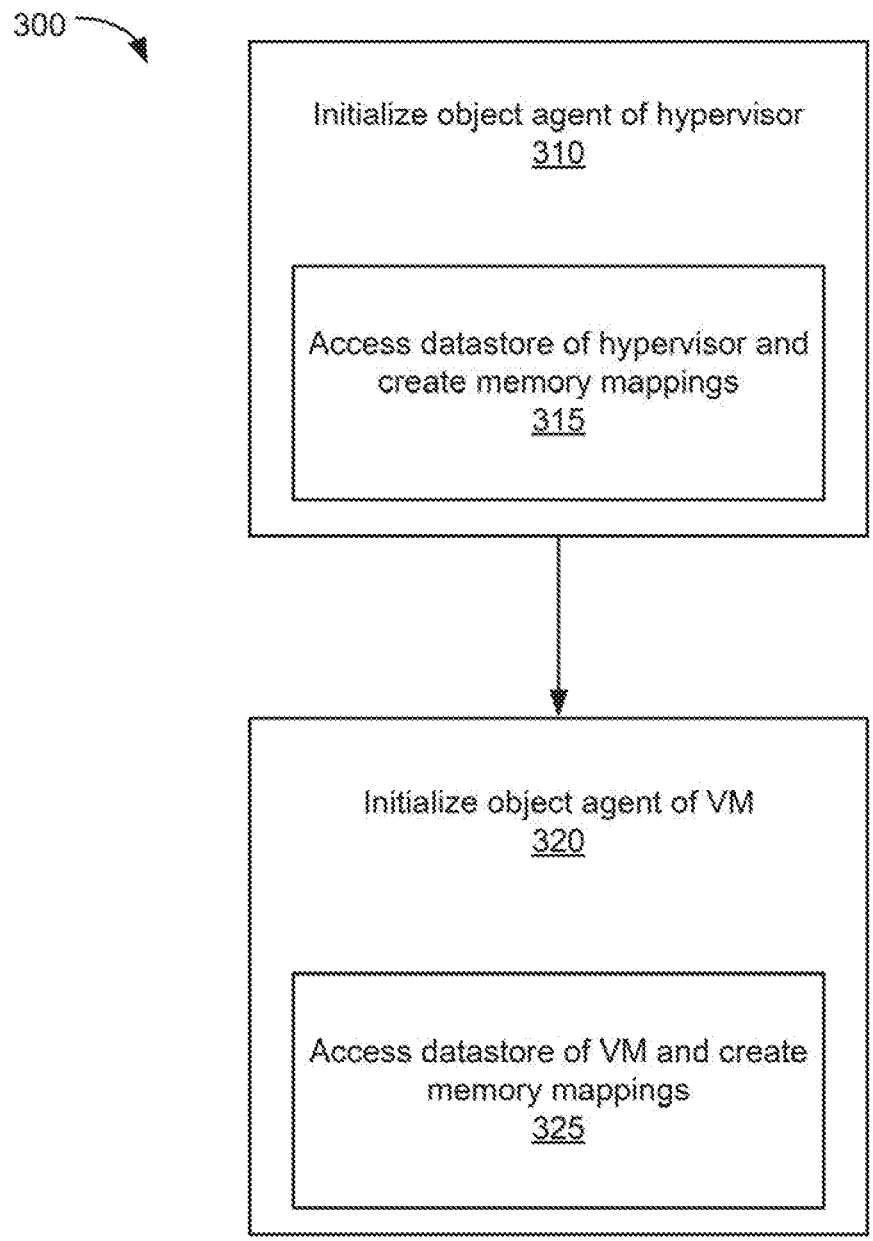
FIG. 3 depicts a method for initializing object agents according to one or more embodiments.

FIG. 3 illustrates method 300 for initializing object agents in a hypervisor and virtual machines. At step 310 the object agent on a hypervisor is initialized. For example, object agent 212 of hypervisor 210 is initialized. In response to initializing the object agent within the hypervisor, the hypervisor datastore is accessed and memory mappings of the datastore are created by the object agent (step 315). For example, object agent 210 accesses datastore 214 and creates a memory mapping of the datastore 214 in response to initializing object agent 210.

Further, at step 320, the object agent on each virtual machine is initialized. For example, object agent 222 of virtual machine 220 and object agent 232 of virtual machine 230 are initialized. In response to initializing the object agents, the corresponding datastores are accessed by the object agents and memory mappings of the datastores are created by corresponding objects (step 325). For example, object agent 222 accesses datastore 224 and generates a mapping of the datastore 224. Further, object agent 232 accesses datastore 234 and generates a mapping of the datastore 234. In one embodiment, object agents of each virtual machine communicate with the object agent on the hypervisor to aid in the creation of the mapping of the hypervisor datastore.

Figure 4:
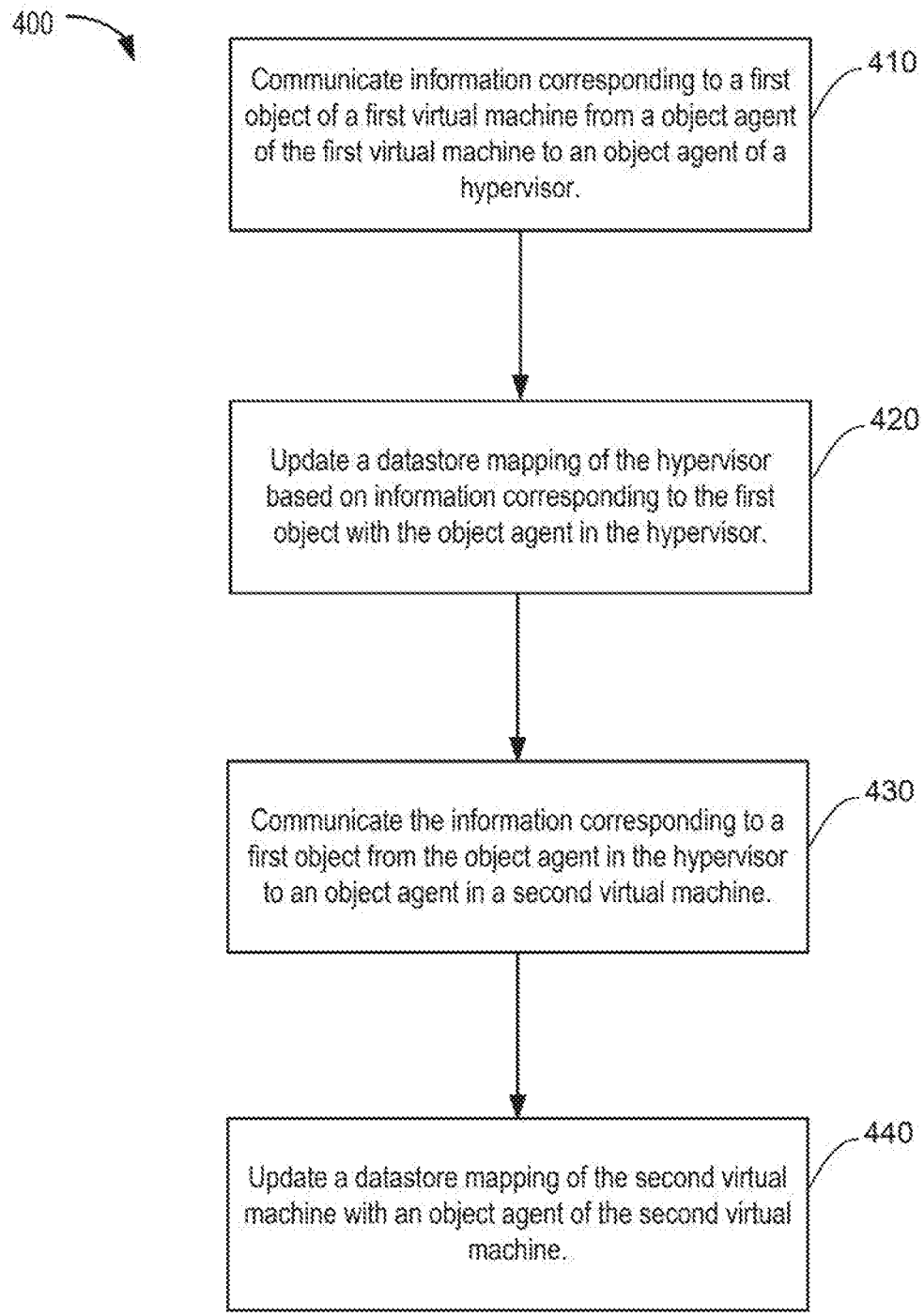
FIG. 4 depicts a method for communicating information corresponding to one or more objects between object agents according to one or more embodiments.

FIG. 4 illustrates a method 400 for communicating information corresponding objects between object agents in a hypervisor and virtual machines. Method 400 begins at step 410, where information of a first object in a first virtual machine is communicated from an object agent (222) of the first virtual machine (220) to an object agent (212) of a hypervisor (210). In one embodiment, object agent 222 identifies that an object of a first virtual machine has been updated from a mapping of datastore 224 and communicates the object identifier and a flag reflecting the change to object agent 212. At step 420420 of the method, a mapping of datastore (214) within the hypervisor is updated based on the communicated change and corresponding object identifier from the object agent (222). In one embodiment, object agent 212 updates a flag within a mapping of datastore 214 corresponding to the object identifier based on the received change. At step 430 of the method, a change is communicated from the object agent (212) of the hypervisor (210) to an object agent (232) of a second virtual machine (230). In one embodiment, hypervisor 210 identifies that virtual machine 230 includes a reference to the object and communicates the object identifier and flag reflecting the change to object agent 232 of virtual machine 230. At step 440, the mapping of datastore (234) of the second virtual machine (230) is updated to reflect the change. In one embodiment, a flag corresponding to the change object within a mapping of datastore 234 is updated by object agent 232.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of datastore management within a computer system having a hypervisor running virtual machines, the method comprising:
communicating information corresponding to a first object of a first virtual machine of the virtual machines from an object agent in the first virtual machine to an object agent in the hypervisor;
updating, by the object agent in the hypervisor, a datastore mapping of the hypervisor based on the information corresponding to the first object;
communicating the information from the object agent in the hypervisor to an object agent in a second virtual machine of the virtual machines; and
updating, by the object agent of the second virtual machine, a datastore mapping within the second virtual machine with the information corresponding to the first object.

2. The method of claim 1, wherein the datastore mapping within the hypervisor associates each object of the hypervisor with at least one of a unique identifier, an object size, the number of virtual machine references, an object flag, and referencing virtual machine information.

3. The method of claim 1, wherein a datastore mapping within the first virtual machine associates each object of the first virtual machine with at least one of a unique identifier, an object size, an associated mapping with the hypervisor object agent, an object flag, and one or more parameters.

4. The method of claim 1, further comprising identifying another virtual machine having the first object.

5. The method of claim 1, wherein communicating the information corresponding to the first object comprises communicating a verdict of an anti-virus scan, and communicating the change of the first object to the second virtual machine comprises communicating the verdict to the second virtual machine.

6. The method of claim 5, wherein communicating the verdict to the second virtual machine comprises instructing the second virtual machine to delete the first object when the verdict indicates the object is infected.

7. The method of claim 1, wherein communicating the information corresponding to the first object to the object agent of the hypervisor comprises communicating a notification of a software update, and communicating the change of the first object to the second virtual machine comprises communicating the software update to the second virtual machine.

8. The method of claim 1, further comprising providing, by the object agent of the hypervisor, node information from a first virtual machine to a second virtual machine based on a restore request from the second virtual machine.

9. The method of claim 1, further comprising delinking the first virtual machine from a third virtual machine of the virtual machines, wherein the first and third virtual machines are clones.

10. A system for datastore management, the system comprising:
a memory; and
at least one processor coupled to the memory, the memory and the at least one processor being configured to:

run a hypervisor comprising:
 a first datastore mapping; and
 a first object agent; and
run a first virtual machine configured to run on the hypervisor, the first virtual machine comprising:
 a second datastore mapping;
 a first plurality of objects; and
 a second object agent communicatively coupled to the first object agent and configured to: communicate information corresponding to a first object of the first plurality of objects to the first object agent,
run a second virtual machine configured to run on the hypervisor, the second virtual machine comprising:
 a third datastore mapping;
 a second plurality of objects; and
 a third object agent communicatively coupled to the first object agent and configured to: receive the information corresponding to the first object and update a corresponding object of the second plurality of objects.

11. The system of claim 10, wherein the first object agent is further configured to update the first datastore mapping based on the information corresponding to the first object.

12. The system of claim 10, wherein communicating the information corresponding to the first object to the first object agent comprises communicating a verdict of an anti-virus scan, and the first object agent is configured to communicate the verdict to the third object agent of the second virtual machine.

13. The system of claim 10, wherein communicating the information corresponding to the first object to the first object agent comprising communicating a software update, and the first object agent is configured to co communicate the software update to the third object agent of the second virtual machine.

14. The system of claim 10, wherein the first object agent is further configured to provide node information from a first virtual machine to the third object agent of the second virtual machine based on a restore request from the second virtual machine.

15. The system of claim 10, wherein the first object agent is further configured to delink the first virtual machine from a third virtual machine, wherein the first and third virtual machines are clones.

16. A non-transitory computer-readable storage medium containing instructions for controlling a computer processor to:
 communicate information corresponding to the first object in a first virtual machine from an object agent in the first virtual machine to an object agent in a hypervisor;
 update, by the object agent in the hypervisor, a datastore mapping within the hypervisor based on the information corresponding to the first object;
 communicate the information corresponding to the first object from the object agent in the hypervisor to an object agent in a second virtual machine; and
 update, by the third object agent, a datastore mapping within the second virtual machine with the information corresponding to the first object.

17. The non-transitory computer-readable storage medium of claim 16, wherein communicating the information corresponding to the first object comprises communicating a verdict of an anti-virus scan, and communicating the change of the first object to the second virtual machine comprises communicating the verdict to the second virtual machine.

18. The non-transitory computer-readable storage medium of claim 16, wherein communicating the information corresponding to the first object to the object agent of the hypervisor comprises communicating a notification of a software update, and communicating the change of the first object to the second virtual machine comprises communicating the software update to the second virtual machine.

19. The non-transitory computer-readable storage medium of claim 16, further providing, by the object agent of the hypervisor, node information from a first virtual machine to a second virtual machine based on a restore request from the second virtual machine.

20. The non-transitory computer-readable storage medium of claim 16, further comprising delinking the first virtual machine from a third virtual machine, wherein the first and third virtual machines are clones.

\* \* \* \* \*